US007213317B2

(12) United States Patent
Hu

(10) Patent No.: US 7,213,317 B2
(45) Date of Patent: May 8, 2007

(54) SHAFT PUSHING DEVICE

(76) Inventor: Chih Kuo Hu, No. 28, Lane 237, Wucyuan 5th St., West District, Taichung 403 (TW)

(*) Notice: Subject to any disclaimer, the term of this patent is extended or adjusted under 35 U.S.C. 154(b) by 94 days.

(21) Appl. No.: 11/076,932

(22) Filed: Mar. 11, 2005

(65) Prior Publication Data

US 2006/0200962 A1 Sep. 14, 2006

(51) Int. Cl.
*B23P 19/04* (2006.01)

(52) U.S. Cl. ........................................................ 29/261

(58) Field of Classification Search .................. 29/261, 29/262, 259, 260, 246

See application file for complete search history.

(56) References Cited

U.S. PATENT DOCUMENTS 7,047,609 B2 * 5/2006 Hu et al. ...................... 29/261
7,117,573 B1 * 10/2006 Hu .............................. 29/261

* cited by examiner

*Primary Examiner*—Robert C. Watson
(74) *Attorney, Agent, or Firm*—Rosenberg, Klein & Lee

(57) ABSTRACT

A shaft pushing device includes a driving mechanism with a threaded tube and a push rod movably extends through the threaded tube. A grasp mechanism has a first ring threadedly mounted to the threaded tube and a plurality of pawls are pivotably connected to the first ring. An adjusting mechanism has an adjusting nut threadedly mounted to the threaded tube and located between the first ring and the distal end of the push rod. A second ring is mounted to the adjusting nut and a plurality of stretch rods are pivotably connected between the pawls and the second ring. The push rod is driven to extend from the threaded tube to push against an end of the shaft and the pawls are pivoted to grasp the gear mounted to the shaft by operating the adjusting nut. The shaft is disengaged from the gear by the push rod.

7 Claims, 6 Drawing Sheets

SHAFT PUSHING DEVICE

FIELD OF THE INVENTION

The present invention relates to a shaft pushing device with a driving mechanism for adjusting pawls of the pushing device.

BACKGROUND OF THE INVENTION

For a conventional transmission mechanism including a shaft and a gear for example, the gear is securely mounted to the shaft so as to transfer torque via the gear. A conventional shaft pushing device is used to separate the shaft from the gear when in maintenance. Due to the secured connection between the gear and the shaft, the shaft pushing device has to hold the gear while pushing the shaft from the gear. The convention shaft pushing device generally includes an operation portion and a plurality of pawls which are pivotably connected to the operation portion. A push rod is connected to the operation portion which is extended by operating the operation portion and pushes against an end of the shaft. The user then carefully rotates a nut of the operation portion to control the pivotal movement of the pawls to grasp the gear. During the operation of the nut, the user has to frequently check the pawls to make sure that the pawls are positioned at desired positions on the shaft. The pawls often move off from the shaft when the user operates the nut. This takes a lot of time and could damage the shaft.

The present invention intends to provide a shaft pushing device that includes an adjusting mechanism which is movably mounted to the threaded tube of the shaft pushing device and easily controls the movement of the pawls to grasp the gear.

SUMMARY OF THE INVENTION

The present invention relates to a shaft pushing device that comprises a driving mechanism having a threaded tube with a threaded outer periphery and a push rod movably extends through the threaded tube. A distal end of the push rod extends out from an end of the threaded tube and is used to push against a shaft. A grasp mechanism has a first ring threadedly mounted to the threaded tube and a plurality of pawls are pivotably connected to the first ring. Each pawl has a hook end so as to grasp a gear. An adjusting mechanism has an adjusting nut threadedly mounted to the threaded tube and located between the first ring and the distal end of the push rod. A second ring is mounted to the adjusting nut and a plurality of stretch rods are pivotably connected between the pawls and the second ring.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
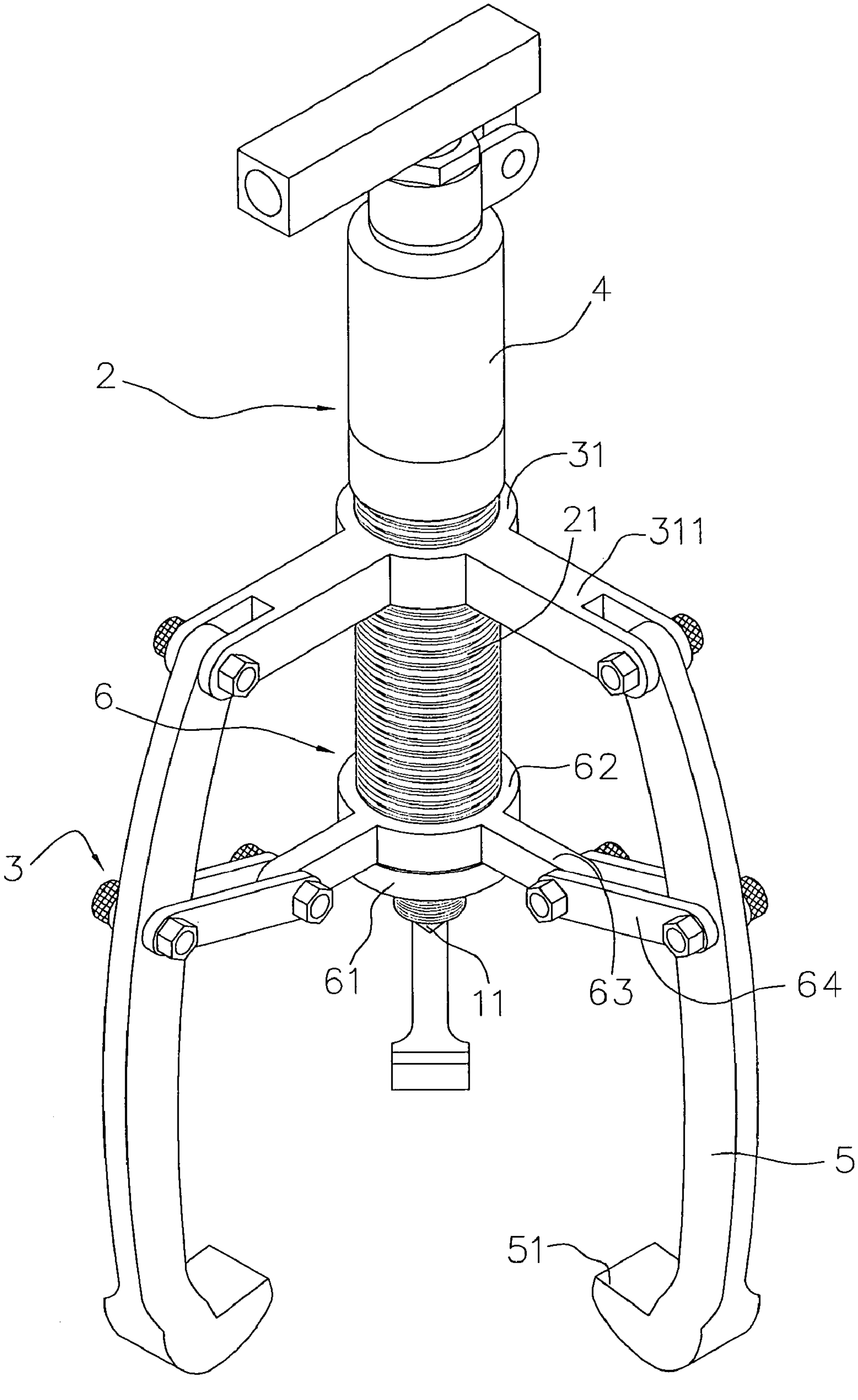
FIG. 1 is a perspective view to show the shaft pushing device of the present invention.
Figure 2:
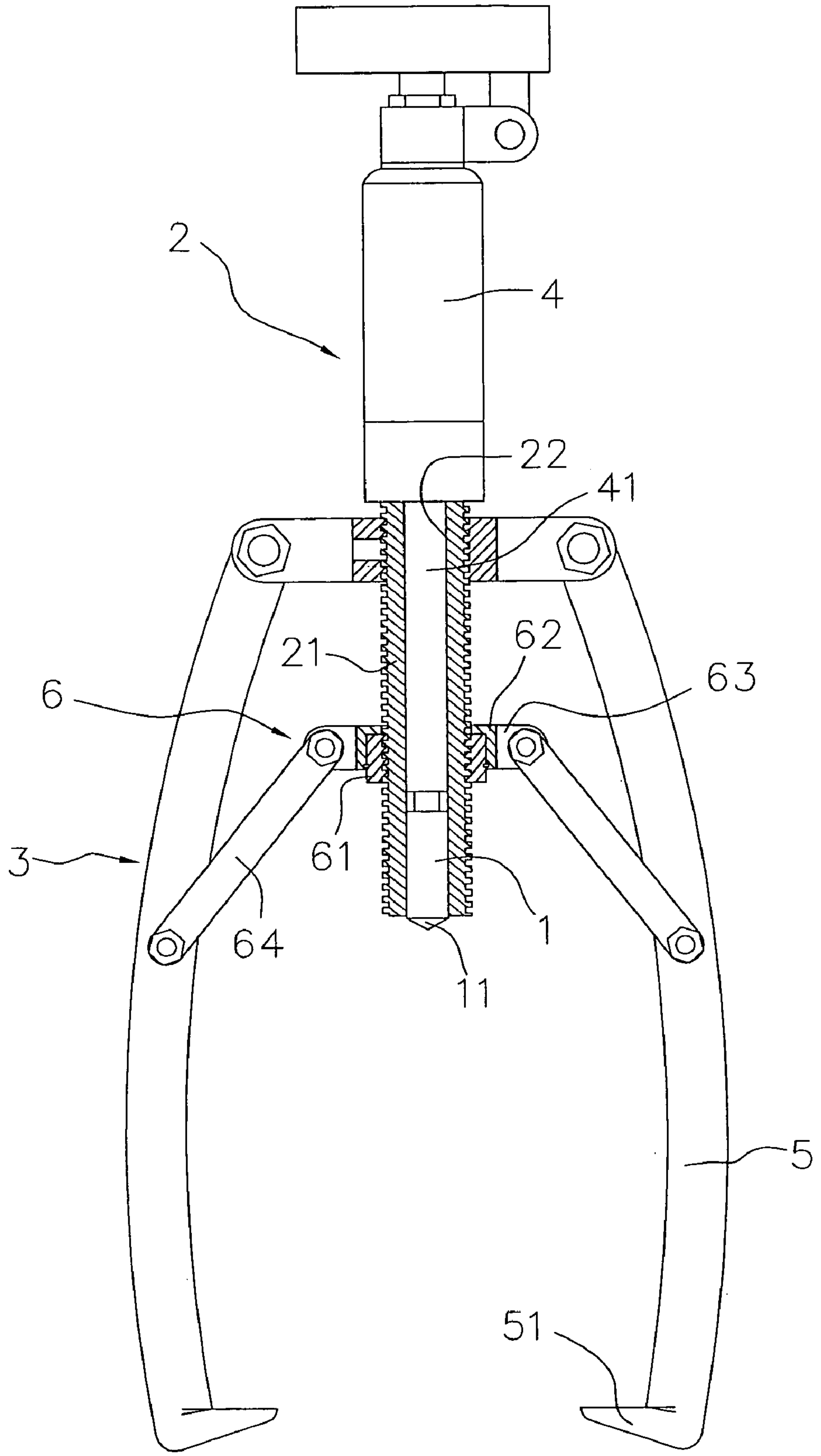
FIG. 2 is a cross sectional view to show the shaft pushing device of the present invention.
Figure 3:
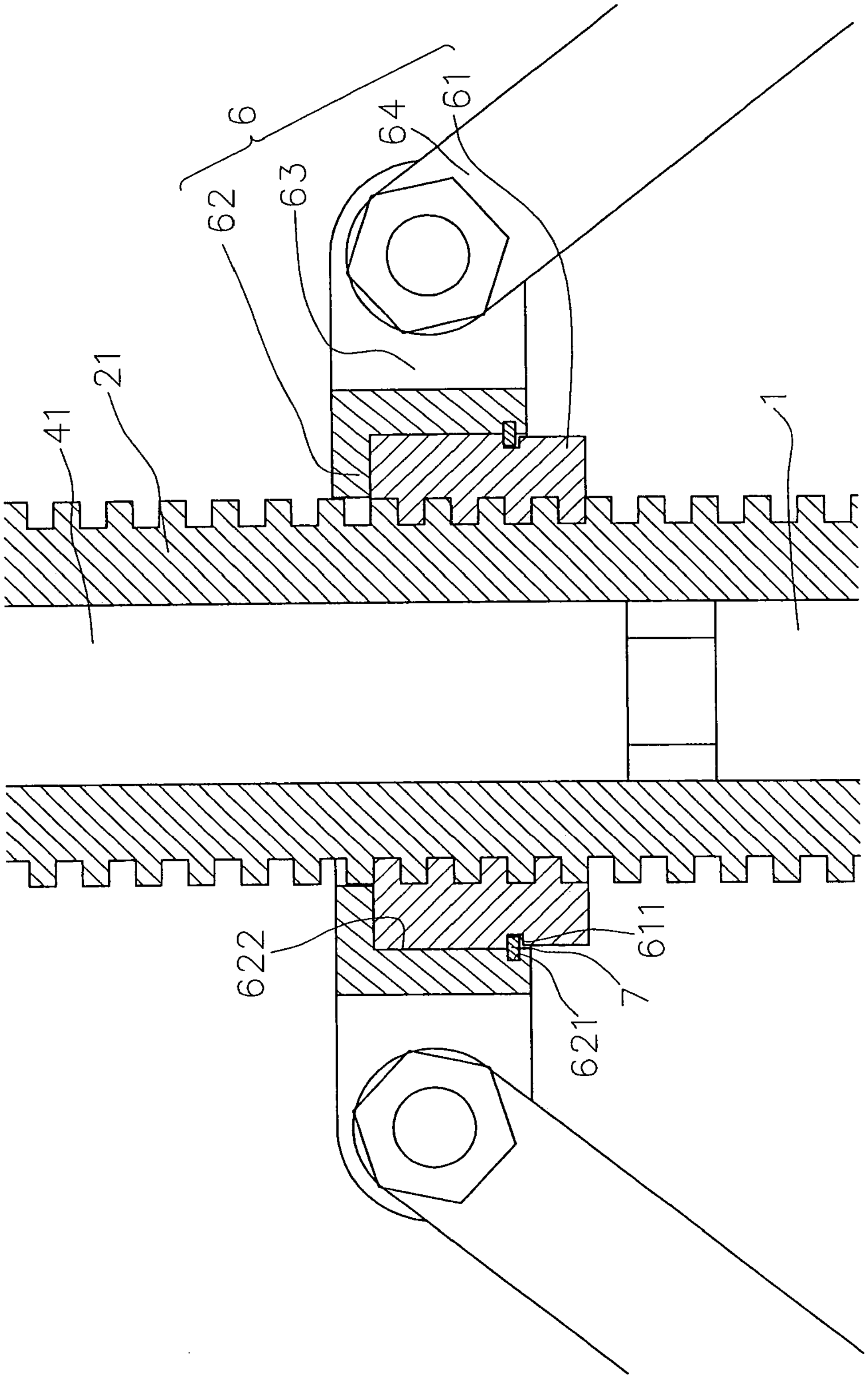
FIG. 3 is an enlarged cross sectional view to show the connection of the adjusting mechanism and the threaded tube of the shaft pushing device of the present invention.

Referring to FIGS. 1 to 4, the shaft pushing device of the present invention comprises a driving mechanism 2, a grasp mechanism 3 and an adjusting mechanism 6. The driving mechanism 2 includes a threaded tube 21 with a threaded outer periphery and a central passage 22. A driving device 4 is connected to an end of the threaded tube 21 and can be a hydraulic or pneumatic cylinder which includes a piston rod 41 movably extending into the threaded tube 21. A push rod 1 has one end in contact with the piston rod 41 and received in the threaded tube 21, and a distal end 11 of the push rod 1 extends out from the other end of the threaded tube 21.

The grasp mechanism 3 includes a first ring 31 threadedly mounted to the threaded tube 21 and a plurality of first extensions 311 extend radially from the first ring 31. A plurality of pawls 5 are pivotably connected to the first extensions 311 and each pawl 5 has a hook end 51.

The adjusting mechanism 6 includes an adjusting nut 61 threadedly mounted to the threaded tube 21 and located between the first ring 31 and the distal end 11 of the push rod 1. A second ring 62 includes a recess 622 defined in an underside thereof with which the adjusting nut 61 is engaged. The second ring 62 includes a first groove 621 defined in an inner periphery thereof and the adjusting nut 61 includes a second groove 611 defined in an outer periphery thereof. A C-clamp 6 is engaged with the first groove 621 and the second groove 611 which is located in alignment with the first groove 621 such that the adjusting nut 61 and the second ring 62 are connected with each other. The second ring 62 includes a plurality of second extensions 63 extending radially therefrom and a plurality of stretch rods 64 are pivotably connected between the second extensions 63 and respective middle portions of the pawls 5.

Figure 4:
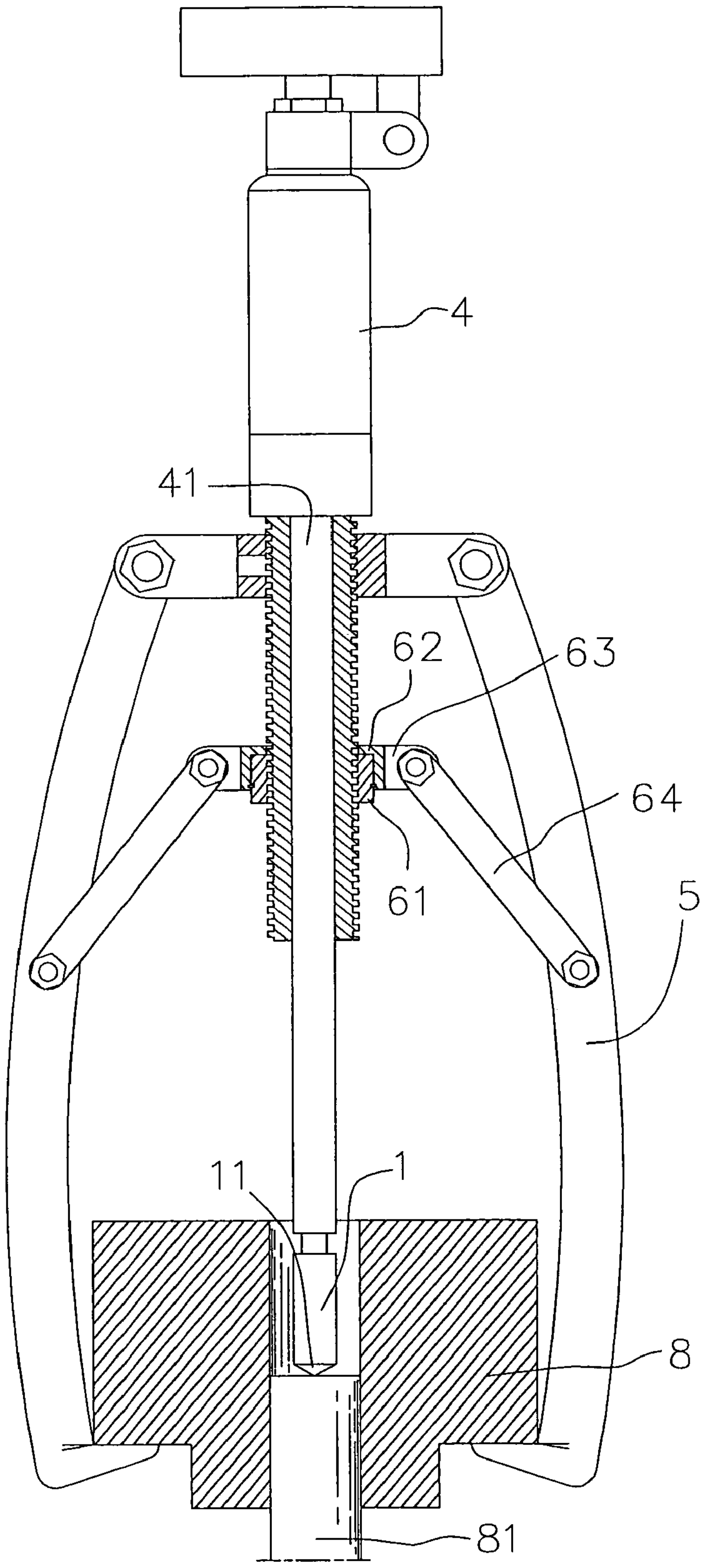
FIG. 4 shows that the pawls grasp the gear and the push rod pushes the shaft from the gear.

As shown in FIG. 4, when operating the shaft pushing device, the adjusting nut 61 is rotated to move the second ring 62 along the threaded tube 21, and the pawls 5 are then pivoted by the stretch rods 64 to grasp a gear 8 by the hook ends 51. The user then activates the driving device 4 to push the push rod 1 to push an end of the shaft 81 which is then disengaged from the gear 8. During the operation, the user simply focuses on the grasp of the pawls 5 to the gear 8 and needs not to check the action of the driving device 4. The procedures of operation of the shaft pushing device is simplified.

Figure 5:
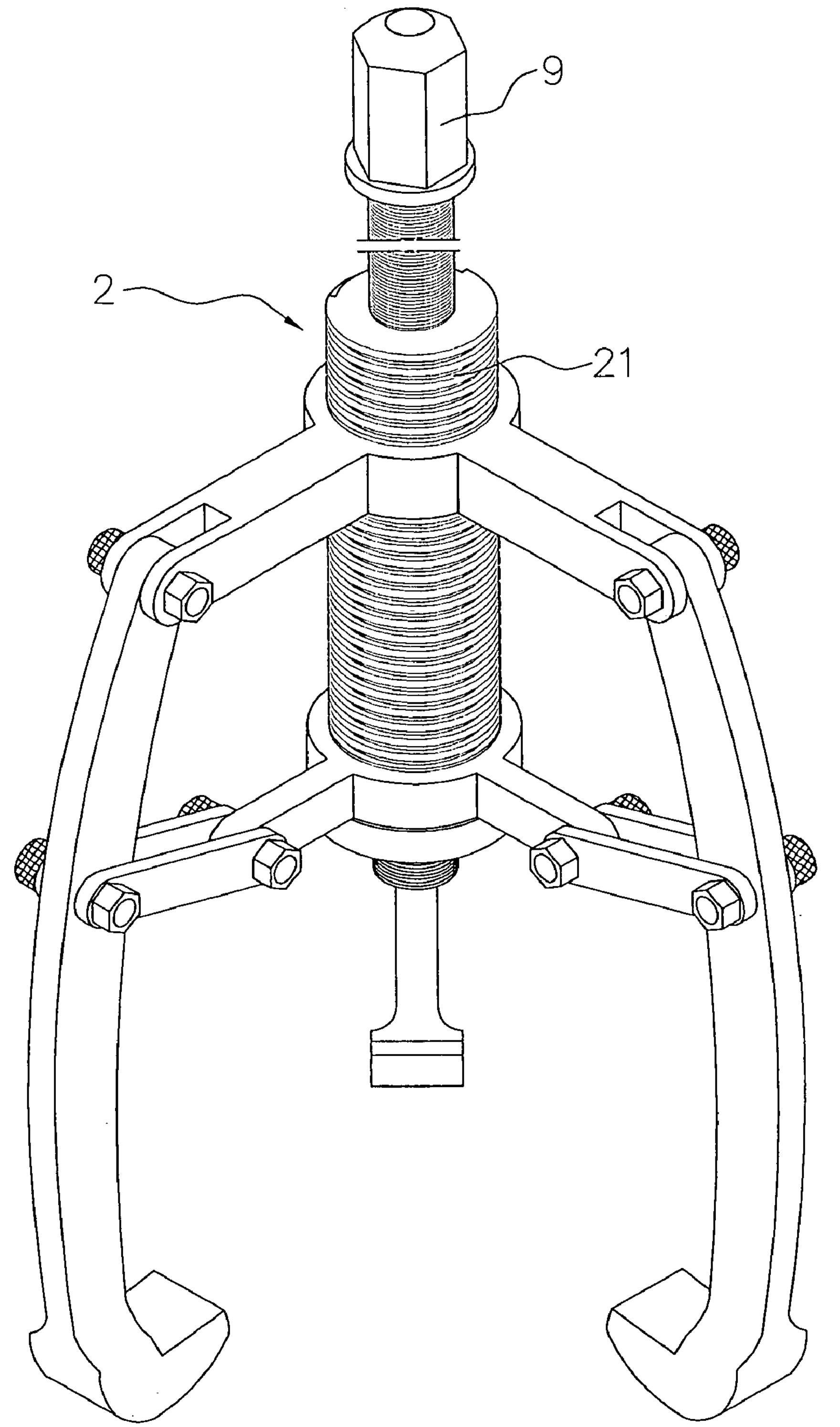
FIG. 5 is a perspective view to show another embodiment of the shaft pushing device of the present invention.
Figure 6:
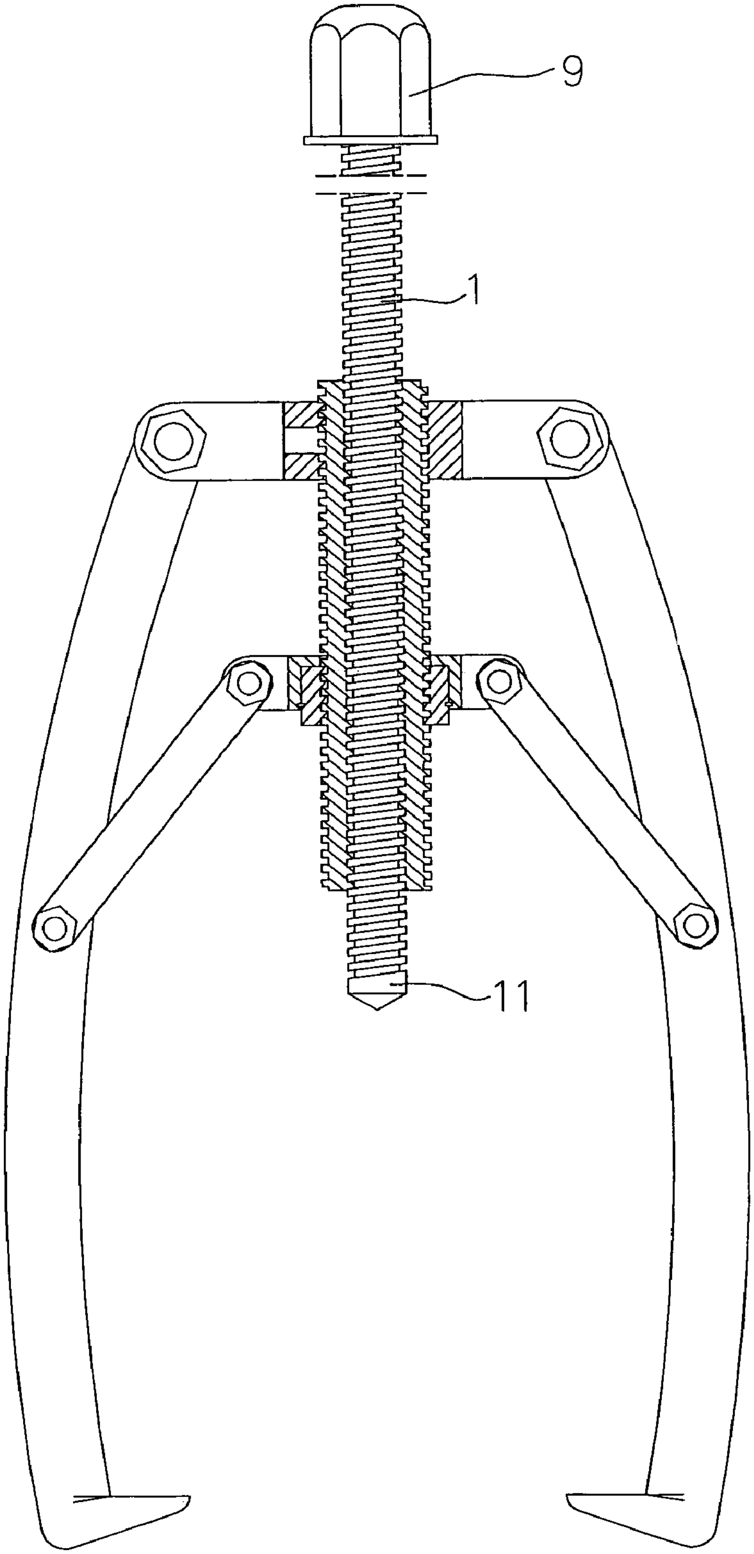
FIG. 6 is a cross sectional view to show the shaft pushing device in FIG. 5.

FIGS. 5 and 6 show another embodiment of the present invention, wherein the threaded tube 21 includes a threaded inner periphery and the push rod 1 is threadedly connected to the threaded inner periphery of the threaded tube 21. A driving device 9 is connected to the push rod 1 and can be a motor for rotating the push rod 1. The push rod 1 can also be rotated manually.

While we have shown and described the embodiment in accordance with the present invention, it should be clear to those skilled in the art that further embodiments may be made without departing from the scope of the present invention.

What is claimed is:

1. A shaft pushing device comprising:

a driving mechanism having a threaded tube with a threaded outer periphery and a push rod movably extending through the threaded tube, a distal end of the push rod extending out from an end of the threaded tube;

a grasp mechanism having a first ring threadedly mounted to the threaded tube and a plurality of pawls pivotably connected to the first ring, each pawl having a hook end, and an adjusting mechanism having an adjusting nut threadedly mounted to the threaded tube and located between the first ring and the distal end of the push rod, a second ring mounted to the adjusting nut and a plurality of stretch rods pivotably connected between the pawls and the second ring whereby the adjusting nut when turned moves the threaded nut and the second ring axially along the threaded tube and thereby adjusts the hook ends of the pawls inward or outward.

2. The device as claimed in claim 1, wherein a driving device is connected to the other end of the threaded tube so as to push the push rod.

3. The device as claimed in claim 1, wherein the threaded tube includes a threaded inner periphery and the push rod is threadedly connected to the threaded inner periphery of the threaded tube, a driving device is connected to the push rod.

4. The device as claimed in claim 1, wherein the first ring includes a plurality of first extensions and the pawls are pivotably connected to the first extensions.

5. The device as claimed in claim 1, wherein the second ring includes a plurality of second extensions and the stretch rods are pivotably connected to the second extensions.

6. The device as claimed in claim 1, wherein the stretch rods are pivotably connected to respective middle portions of the pawls.

7. The device as claimed in claim 1, wherein the second ring includes a first groove defined in an inner periphery thereof and the adjusting nut includes a second groove defined in an outer periphery thereof, C-clamp is engaged with the first groove and the second groove which is located in alignment with the first groove.

* * * * *